US008086796B2

(12) United States Patent
Arai et al.

(10) Patent No.: US 8,086,796 B2
(45) Date of Patent: Dec. 27, 2011

(54) STORAGE SYSTEM, LOAD DISTRIBUTION MANAGEMENT METHOD, AND STORAGE MEDIUM

(75) Inventors: Tsunehiro Arai, Yokohama (JP); Michiaki Sekine, Kawasaki (JP); Akira Matsui, Yokohama (JP); Hiroshi Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 521 days.

(21) Appl. No.: 12/361,786

(22) Filed: Jan. 29, 2009

(65) Prior Publication Data

US 2010/0131705 A1  May 27, 2010

(30) Foreign Application Priority Data

Nov. 26, 2008 (JP) ................................. 2008-300356

(51) Int. Cl.
*G06F 12/00* (2006.01)
(52) U.S. Cl. ........ 711/114; 711/156; 711/203; 711/205; 711/221
(58) Field of Classification Search .................. 711/114, 711/156, 203, 205, 221
See application file for complete search history.

(56) References Cited

U.S. PATENT DOCUMENTS

| 7,461,201 | B2 * | 12/2008 | Amano et al. ................ 711/111 |
| 7,523,253 | B2 * | 4/2009 | Mizuno ......................... 711/111 |
| 7,539,817 | B2 * | 5/2009 | Hashimoto et al. ........... 711/114 |
| 7,747,835 | B1 * | 6/2010 | Chatterjee et al. ............ 711/170 |
| 2006/0025981 | A1 | 2/2006 | Papaefstathiou et al. |
| 2006/0230103 | A1 * | 10/2006 | Takamoto et al. ............ 709/203 |
| 2007/0130424 | A1 * | 6/2007 | Hashimoto et al. .......... 711/114 |
| 2009/0077311 | A1 * | 3/2009 | Amano et al. ................ 711/111 |

FOREIGN PATENT DOCUMENTS

JP  2006-318012  11/2006

* cited by examiner

*Primary Examiner* — Stephen Elmore
(74) *Attorney, Agent, or Firm* — Antonelli, Terry, Stout & Kraus, LLP.

(57) ABSTRACT

A host computer includes a virtual disk control part for controlling an input/output request into a virtual disk. A plurality of storage subsystems includes a load monitoring part for measuring a load on a physical disk by the input/output request and storing load information in a disk management table. The virtual disk control part identifies, upon receiving the input/output request into a not-ever-outputted space in a virtual disk, an appropriate logical disk on the virtual disk based on the load information in the disk management table, sends the input/output request to the storage subsystem having the identified logical disk, and updates, upon receiving a completion acknowledgement of the input/output request, the load information in the disk management table based on the load information in the logical disk map information table.

11 Claims, 7 Drawing Sheets

FIG.2

132 Disk management table

| Virtual disk name (200) | Logical disk name (201) | Load information (202) |
|---|---|---|
| VDEV01 | LDEV01 | 170MB/s |
|  | LDEV02 | 80MB/s |
|  | LDEV03 | 0MB/s |
| VDEV02 | LDEV11 |  |
|  | LDEV12 |  |
|  | ... |  |
| ... | ... |  |

FIG.3

133 Virtual disk map information table

VDEV02

VDEV01

| Space on virtual disk (300) | Logical disk for data output (301) |
|---|---|
| CYL00-10 | LDEV01 |
| CYL11-20 | LDEV02 |
| CYL21-30 | LDEV03 |
| CYL31-40 | LDEV01 |
| CYL41-50 | No data output |
| ... | ... |

FIG.4

192 Logical disk map information table

LDEV03
LDEV02

| LDEV01 | 400 | 401 | 402 | 403 |
|---|---|---|---|---|
| Space on logical disk | Data status | Physical disk for data output | Load information | |
| CYL00-10 | Data present | PDEV01 | 80MB/s | |
| CYL11-20 | No data | — | — | |
| CYL21-30 | No data | — | — | |
| CYL31-40 | Moving to LDEV03 | PDEV02 | 90MB/s | |
| CYL41-50 | No data | — | — | |
| ... | ... | ... | ... | |

STORAGE SYSTEM, LOAD DISTRIBUTION MANAGEMENT METHOD, AND STORAGE MEDIUM

CROSS REFERENCE TO RELATED APPLICATIONS

This application claims the benefit of Japanese Patent Application No. 2008-300356 filed on Nov. 26, 2008, the disclosure of which is incorporated herein by reference.

BACKGROUND OF THE INVENTION

1. Field of the Invention

The present invention relates to a storage system including a host computer and a plurality of storage subsystems, and virtualization and load distribution techniques of the storage subsystem.

2. Description of the Related Art

A technique of moving a data for storage subsystem within a single disk control device has been known in a storage subsystem including the disk control device and a physical disk. A load distribution technique across a plurality of disk control devices by adjusting intervals of receiving input/output requests from a host computer has also been known.

For example, Japanese Published Patent Application No. 2006-318012 discloses a technique in which, in a control system in which a plurality of disk controller clusters each for controlling a data transfer between a host computer and a disk drive device are connected, the disk controller clusters are each provided with an in-cluster resource usage monitor for monitoring a resource usage in the disk controller. An in-system resource usage monitor for monitoring a resource in the system is also provided, which collects information monitored by a plurality of in-cluster resource usage monitors and take the information as monitor information on in-system resource usage monitoring. An issue interval of an IO job across a plurality of the disk controller clusters is adjusted based on the monitor information on in-system resource usage monitoring so as to conduct a load distribution of the IO job in the whole system. However, the technique has such problems that the adjustment of the issue interval of an IO job may reduce performance of access to a requested resource and may negatively affect work performance.

To solve the above problems, the present invention has been made in an attempt to provide a storage system, a load distribution management method, and a storage medium which can perform a load distribution between a plurality of disk control devices without affecting performance of host works.

SUMMARY OF THE INVENTION

A storage system includes a host computer and a plurality of disk control devices each for providing a storage space to the host computer. The host computer and a plurality of the disk control devices each have management table information, which allows the host computer to select an optimum disk control device in terms of performance or capacity for issuing an input/output.

Other features and advantages of the present invention will become more apparent from the following detailed description of the invention, when taken in conjunction with the accompanying exemplary drawings.

BRIEF DESCRIPTION OF THE DRAWINGS

FIG. 2 is a configuration diagram showing an example of a disk management table according to the embodiment.

FIG. 3 is a configuration diagram showing an example of a virtual disk map information table according to the embodiment.

FIG. 4 is a configuration diagram showing an example of a logical disk map information table according to the embodiment.

DETAILED DESCRIPTION OF THE EXEMPLARY EMBODIMENT

Next is described the exemplary embodiment for carrying out the present invention with reference to related drawings. It is to be noted that the present invention is not limited to the embodiment described below.

Figure 1:
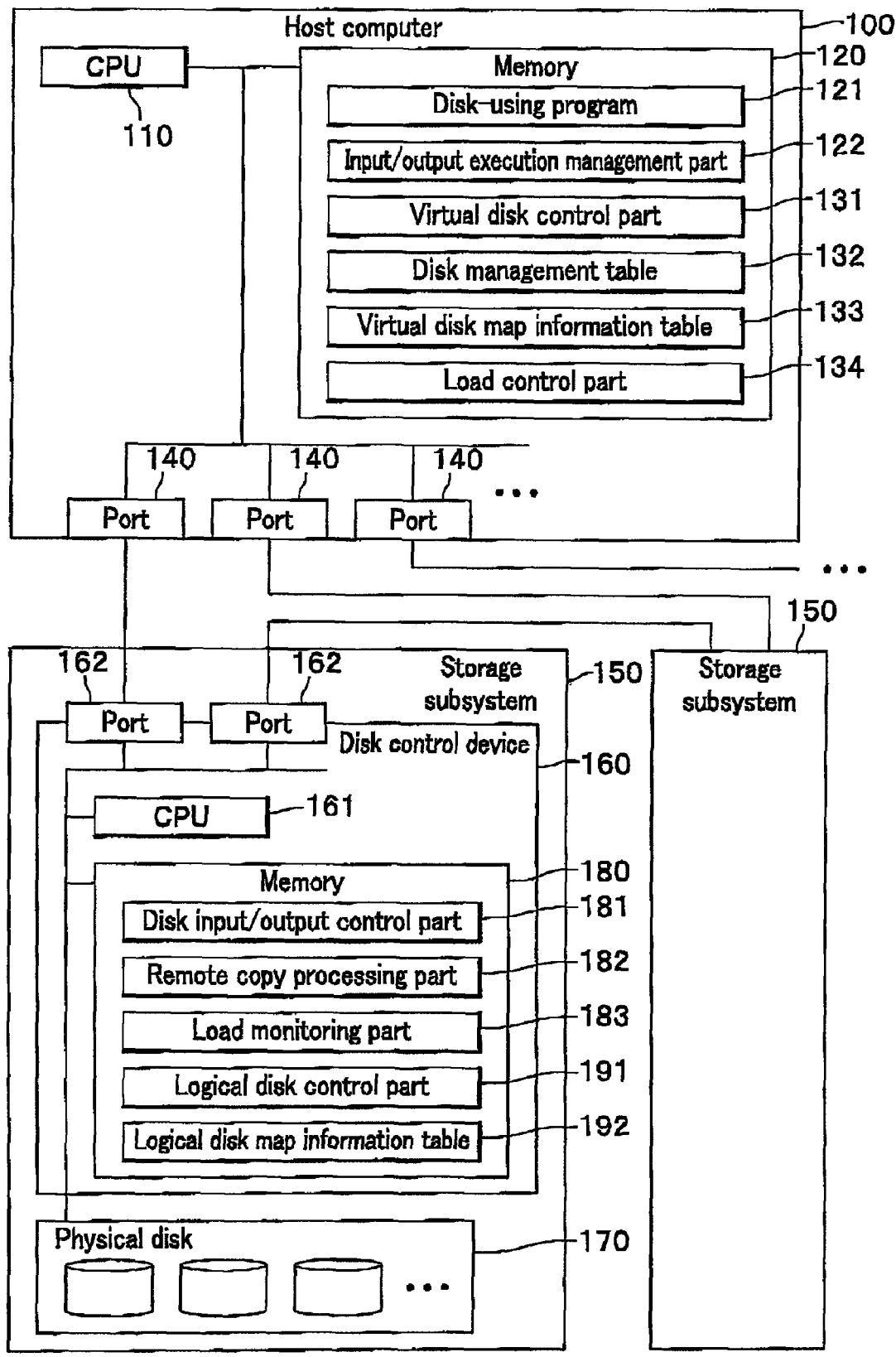
FIG. 1 is a configuration diagram showing an example of a storage system according to an embodiment of the present invention.

FIG. 1 shows an example of a storage system according to the embodiment of the present invention. The embodiment describes a virtualization method and a load distribution method in a storage subsystem. The storage system includes a host computer 100 and a plurality of storage subsystems 150. The host computer 100 is connected to each of the storage subsystems 150 via a port 140 in the host computer 100. The host computer 100 is a computer used by a user and includes a CPU (Central Processing Unit) 110, a memory 120 (which may also be referred to as a first memory part), a port 140, and a connection for connecting the above-mentioned components such as a path and a switch.

The memory 120 stores therein a disk-using program 121, an input/output execution management part 122 for performing an input/output processing into a virtual disk apparatus, a virtual disk control part 131, and a load control part 134, each of which is a program and whose function is realized when executed by the CPU 110. The memory 120 also stores therein a disk management table 132 (see FIG. 2) and a virtual disk map information table 133 (see FIG. 3). The disk management table 132 and the virtual disk map information table 133 may be collectively referred to as first management information.

The disk-using program 121 is a work program of a user who uses a disk device connected to the host computer 100. In the present embodiment, the disk device corresponds to the storage subsystem 150.

The virtual disk control part 131 is a processing part for providing a virtual disk to the disk-using program 121 or the input/output execution management part 122. The virtual disk is a virtually-created disk device using logical disks of a plurality of the storage subsystems 150 provided to the host computer 100. The disk management table 132 stores therein information on a virtual disk associated with logical disks. The virtual disk map information table 133 stores therein information on a data-storing logical disk on a virtual disk. The virtual disk control part 131 executes the above processing by referencing the disk management table 132 and the virtual disk map information table 133.

The load control part 134 is a program for load distribution. The load control part 134 sends an instruction for a remote copy based on a load of a logical disk inputted or outputted via a virtual disk, thereby moves a data to be stored in a cylinder a virtual disk from a logical disk in one storage system to a logical disk in another storage system. After the data movement, the load control part 134 updates virtual disk map information so as to issue an input/output request to the destination logical disk. Note that a cylinder is an aggregate of tracks positioned on a circumference of a circle.

The storage subsystem 150 includes a disk control device 160 and physical disks 170 and is connected to the host computer 100 and another storage subsystem 150 via ports 162 in the disk control device 160.

The disk control device 160 is a computer for controlling the physical disk 170 and includes a CPU 161, a memory 180 (which may also be referred to as a second memory part), a port 162, and a connection for connecting the above-mentioned components, such as a path and a switch.

The memory 180 stores therein a disk input/output control part 181 for executing an input/output processing into the physical disk 170, a remote copy processing part 182 (which may also be referred to as a copy processing part) for copying a space of a logical disk into another storage subsystem 150, a load monitoring part 183 for monitoring load information, and a logical disk control part 191, each function of which is realized when executed by the CPU 161. The memory 180 also stores therein a logical disk map information table 192 (which may also be referred to as second management information) (see FIG. 4).

The disk input/output control part 181 is a program for receiving an input/output request from the host computer 100 and requesting the remote copy processing part 182 to be described later in detail or the logical disk control part 191 to process the input/output request.

The remote copy processing part 182 is a program for copying a space indicated by a cylinder specified by a logical disk provided by the logical disk control part 191 or the whole logical disk, into a space indicated by the same cylinder of the logical disk control part 191 in another storage subsystem 150.

The load monitoring part 183 is a program for measuring a load put on each cylinder of a logical disk by an input/output request and storing the load in the logical disk map information table 192.

The logical disk control part 191 is a program for reading a data stored in the physical disk 170 based on the input/output request in which a logical disk and a cylinder are specified and sending the data to the host computer 100, and also for writing a write data, which is received with the input/output request from the host computer 100 into the physical disk 170.

The logical disk map information table 192 includes information on a physical disk in which a data of a write request (which is one type of the input/output request) in each of a plurality of cylinders of a logical disk is actually assigned and stored, and on a location in the physical disk.

It is to be noted that, when a logical disk is provided by the logical disk control part 191, a space in the logical disk has not yet been assigned to a portion or a whole of a cylinder corresponding thereto, and a space in the physical disk 170 is assigned following a write request into a not-yet-assigned cylinder in the logical disk. This allows to omit an assignment of the physical disk 170 to a cylinder into which a data has not ever been written, thus making it possible to provide a logical disk with a larger storage capacity than that of the physical disk 170. Additionally, another physical disk 170 can be added once an unassigned space in the physical disk 170 falls short, thus making possible to reduce cost. The logical disk control part 191 having the above-mentioned advantages performs a processing as follows.

If the logical disk control part 191 receives a write request and a write data, the logical disk control part 191 references the logical disk map information table 192 and thereby determines whether or not a physical disk is assigned to a cylinder specified by the write request. If a physical disk is determined to be assigned to the cylinder specified by the write request, the logical disk map information table 192 identifies a space in the physical disk already having been assigned and stores the write data into the space. On the other hand, if a physical disk is not determined to be assigned to the cylinder, the logical disk map information table 192 assigns a space which is in the physical disk but has not yet been assigned to any other cylinder, to the cylinder according to prescribed rules and processes the write data in the same way as the former case.

The storage subsystem 150 includes a cache memory, not shown, for temporarily stores spaced data or a write data. This means that the above-stated processing of writing a data into the physical disk is actually storage of the data into the cache memory. The data is then stored in a space in the physical disk according to a prescribed cash algorithm.

If the logical disk control part 191 receives spaced request (which is another type of the input/output request), the logical disk control part 191 references the logical disk map information table 192 and reads a data subjected to the read request from a space of the corresponding physical disk and sends the data to the host computer 100.

The present embodiment provides the host computer 100 with a virtual disk apparatus including two storage subsystems 150. The virtual disk control part 131 of the host computer 100 executes a mapping processing in which spaces on respective logical disks of the two storage subsystems 150 are made use of according to loads.

The mapping processing is executed by each cylinder of the virtual disk provided by the virtual disk control part 131 to the disk-using program 121. The load monitoring part 183 of the storage subsystem 150 measures load on the each cylinder. The load control part 134 of the host computer 100 obtains information on the load on respective logical disks.

If a degree of difference in the loads reaches a predetermined upper limit, the load control part 134 identifies a cylinder having a load sufficiently small to allow a data movement thereinto and instructs the storage subsystem 150 to perform a remote copy, specifying the identified cylinder. The storage subsystem 150 thus moves the data from a space in an original logical disk to a space in another logical disk. After the data movement, the virtual disk control part 131 updates map information on the cylinder of interest, which can realize a granular load distribution in a virtual disk apparatus, that is, a load distribution by cylinders as units.

The present embodiment assumes that a virtual disk and a logical disk have the same number of cylinders, and, if a cylinder in a virtual disk has a cylinder number x, a cylinder in a logical disk corresponding to the virtual desk also has the cylinder number x. This can maintain sequential input/output performance of a logical disk, even if a sequential input/output request is made to a virtual disk. However, the present invention is not limited to this configuration. A cylinder having a cylinder number x in a virtual disk may correspond to a cylinder number having a cylinder number other than x in a logical disk.

Figure 8:
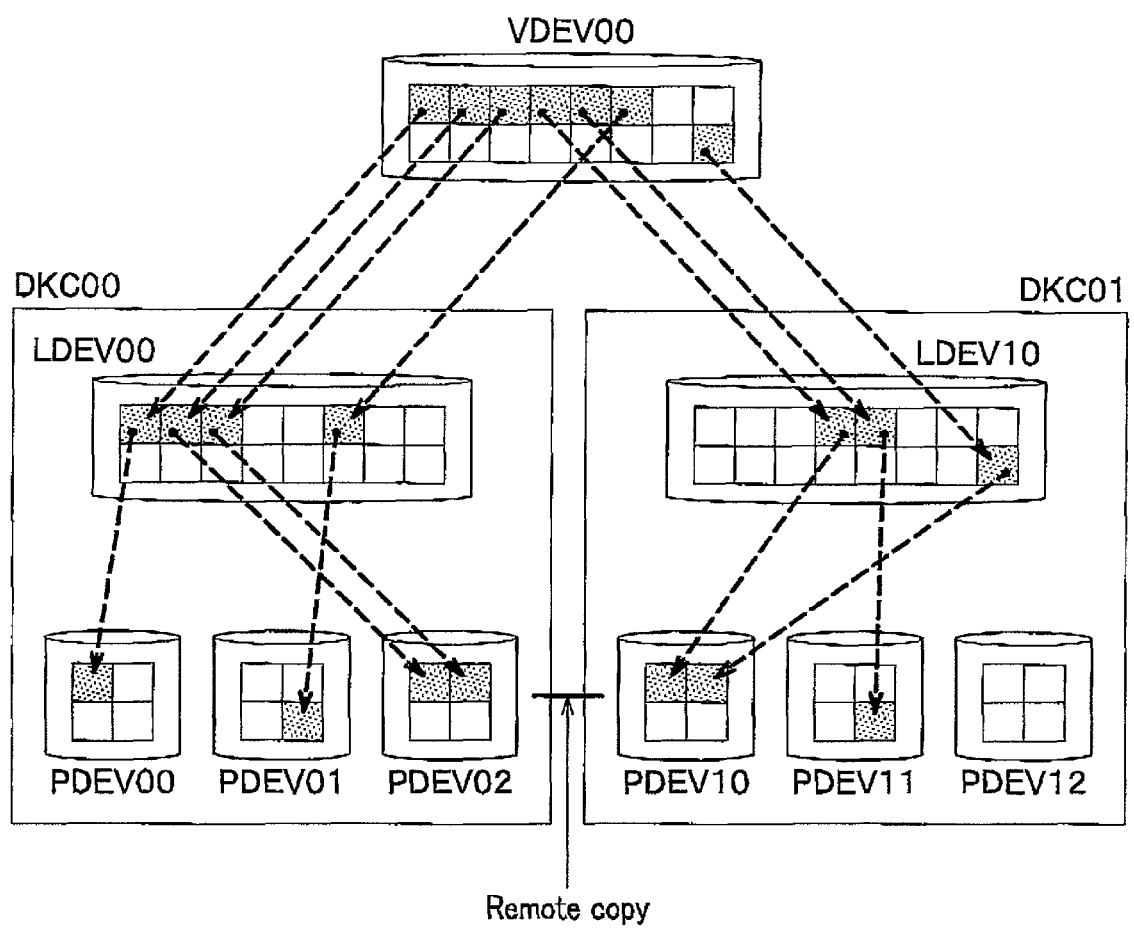
FIG. 8 is an explanatory diagram showing a relation between a virtual disk, a logical disk, and a physical disk according to the embodiment.

FIG. 8 is an explanatory diagram showing a relation between a virtual disk, a logical disk, and a physical disk. It is assumed herein that two disk control devices (DKC00 and DKC01) are each connected to a virtual disk (VDEV00) which is virtually connected to the host computer 100. The disk management table 132 (see FIG. 2) and the virtual disk map information table 133 (see FIG. 3) to be described later in detail associate each storage space in the virtual disk (VDEV00) with logical disks for data output (LDEV00 and LDEV10) Further, the logical disk map information table 192 (see FIG. 4) associates the logical disks with physical disks for data output (PDEV00, PDEV01, PDEV02, PDEV10, PDEV11, and PDEV12).

The present embodiment has a configuration in which the virtual disk (VDEV00) and the logical disks (LDEV00, LDEV10) have the same capacity and in-space address, and data are distributed in the logical disks (LDEV00, LDEV10).

The present embodiment allows a plurality of the disk control devices 160 to be virtually used as one disk control device 160, thus increasing resource efficiency of the disk control devices 160. Further, the load control part 134 can instruct a data movement between the storage subsystems 150, if the load control part 134 determines a necessity for the data movement from information on load received from the load monitoring part 183 of the storage subsystem 150.

FIG. 2 shows a configuration example of the disk management table 132. The disk management table 132 stores therein a virtual disk name 200 which is a name of a virtual disk virtually connected to the host computer 100, a logical disk name 201 which is a name of a logical disk into which the virtual disk outputs a data, and load information 202 for each logical disk. Note that the load information 202 is herein a data usage per unit time. However, the present invention is not limited to this. The load information 202 may be disk usage space or any other information on load.

FIG. 3 shows a configuration example of the virtual disk map information table 133. The virtual disk map information table 133 is present in each virtual disk (for example, VDEVO1 and VDEVO2) and is managed on the host computer 100. The virtual disk map information table 133 stores therein a space on virtual disk 300 and a logical disk for data output 301 corresponding to the space on virtual disk 300. The space on virtual disk 300 is herein represented by cylinders. However, the present invention is not limited this. The space on virtual disk 300 may be represented by tracks or any other units.

FIG. 4 shows a configuration example of the logical disk map information table 192. The logical disk map information table 192 is a table managed in the storage subsystem 150 for each logical disk (for example, LDEV01, LDEV02, and LDEV03). The logical disk map information table 192 stores therein a space on logical disk 400, a data status 401 in the space, a physical disk for data output 402, and load information 403 in the space.

The space on logical disk 400 has a configuration same as that of the space on virtual disk 300 in the virtual disk map information table 133 of FIG. 3. FIG. 4 shows an identifier of a physical disk as information corresponding to each cylinder, but, actually, address information indicating a space in the physical disk is stored. A parity group having a plurality of the physical disks 170 may be used herein instead of one physical disk. Or, an LU (a logical unit) obtained by dividing a parity group may be used instead of the physical disk 170, in which case, the address information is still stored in the physical disk 170 eventually, but, what is stored as a name and address information corresponding to a cylinder is space information (a space identifier) indicating spaces of a plurality of the physical disks 170, based on information on a parity group and a LU.

In the disk management table 132 of FIG. 2, for example, the logical disk LDEV01 has the load information of 170 MB/s. 170 MB/s is calculated by referring to the virtual disk map information table 133 of FIG. 3 which indicates that the virtual disk (VDEV01) is configured by CYL00-10 and CYL31-40 as the space on virtual disk 300 (VDEV01), by referring to the logical disk map information table 192 of FIG. 4 which indicates that CYL00-10 as the space on logical disk 400 (LDEV01) has the load information of 80 MB/s, and CYL31-40 as the space on logical disk 400 has the load information of 90 MB/s, and by adding 80 MB/s to 90 MB/s.

For another example, in the disk management table 132 of FIG. 2, the logical disk LDEV02 has the load information of 80 MB/s. 80 MB/s is similarly calculated by referring to the virtual disk map information table 133 of FIG. 3 which indicates that the virtual disk VDEV01 is configured by the space on virtual disk (VDEV01) CYL11-20, and by referring to the logical disk map information table 192 of FIG. 4 which indicates the load information (not shown) of the space on logical disk (LDEV02) CYL11-20.

Next are described a virtual disk input/output processing and a load distribution data movement processing.

<Virtual Disk Input/Output Processing>

Figure 5:
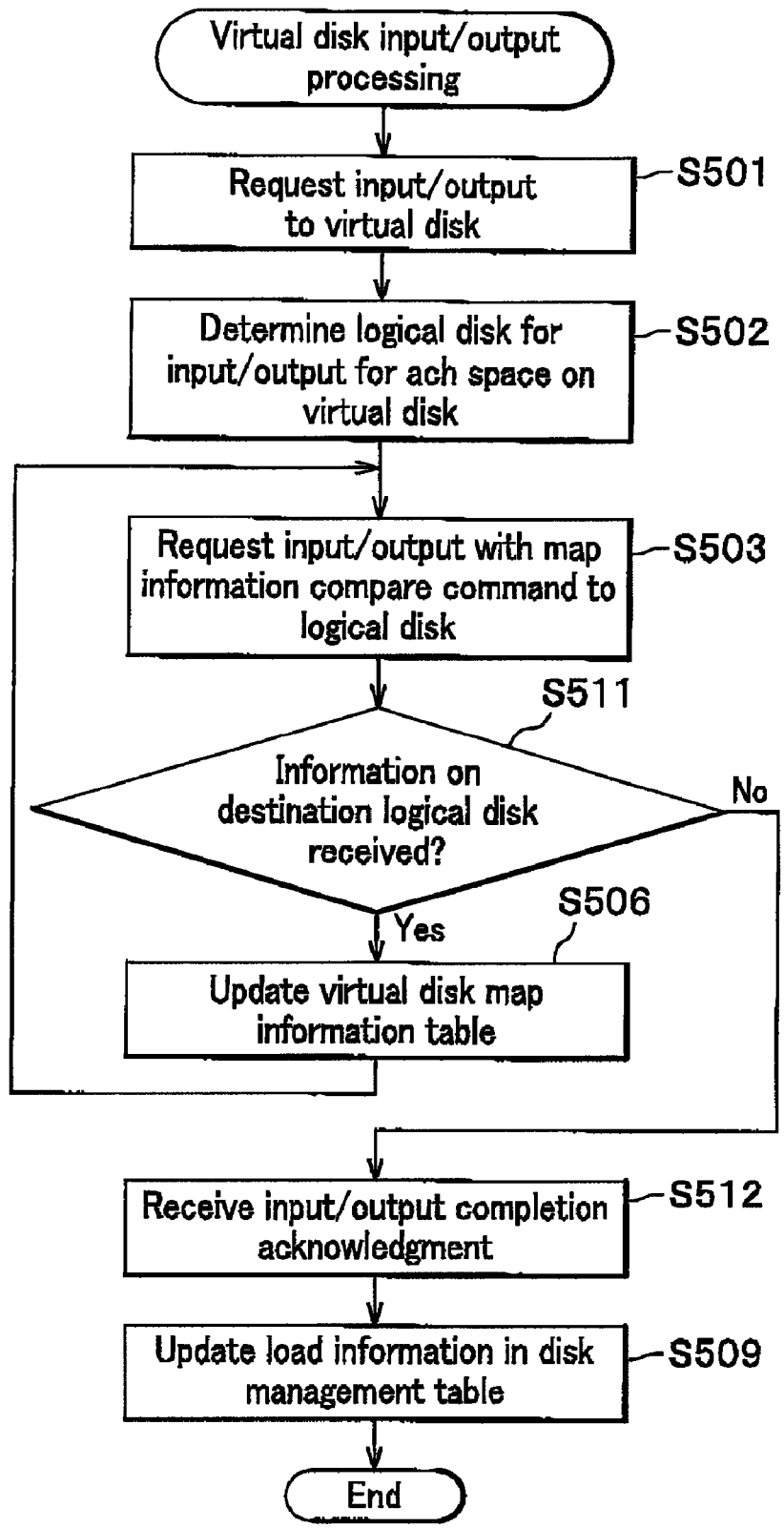
FIG. 5 is a flowchart showing an input/output processing into a virtual disk in a host computer which is executed by a disk-using program 121 according to the embodiment.

FIG. 5 is a flowchart showing an input/output processing into a virtual disk in the host computer 100 which is executed by the disk-using program 121. The disk-using program 121 issues an input/output request (more specifically, an input/output request specifying the virtual disk name 200 and the space on virtual disk 300) in a virtual disk, to the input/output execution management part 122. The input/output execution management part 122 transfers the input/output request in the virtual disk, to the virtual disk control part 131 (step S501).

The virtual disk control part 131 determines a logical disk as an input/output destination, using the logical disk for data output 301 in the virtual disk map information table 133 (step S502). If an output destination is a not-ever-outputted space into which a data has not ever been outputted, the virtual disk control part 131 selects, for example, the logical disk name 201 of a logical disk having smaller load, from among the load information 202 in the disk management table 132 and determines the logical disk for data output 301 to be assigned to the specified space on virtual disk 300.

The virtual disk control part 131 issues the input/output request in the logical disk, to the input/output execution management part 122. The input/output execution management part 122 then issues the input/output request with a map information compare command attached thereto to the disk control device 160 of the storage subsystem 150 (step S503). The map information compare command has, for example, the space on virtual disk 300 as a data output destination.

After the issuance of the input/output request into the disk control device 160 of the storage subsystem 150, if the host computer 100 receives information on a destination logical disk (see step S505 in FIG. 6) (if Yes in step S511), the host computer 100 reflects the reported information on the destination logical disk, in the logical disk for data output 301 in the virtual disk map information table 133 (step S506). The host computer 100 again issues the input/output request to the reported destination logical disk (step S503).

After the issuance of the input/output request to the disk control device 160 of the storage subsystem 150, if the host computer 100 does not receive information on the destination logical disk (if No in step S511), the host computer 100 receives an input/output completion acknowledgment from the logical disk control part 191 of the storage subsystem 150

(step S512), updates the load information 202 in the disk management table 132 (step S509), and terminates the input/output processing.

Figure 6:
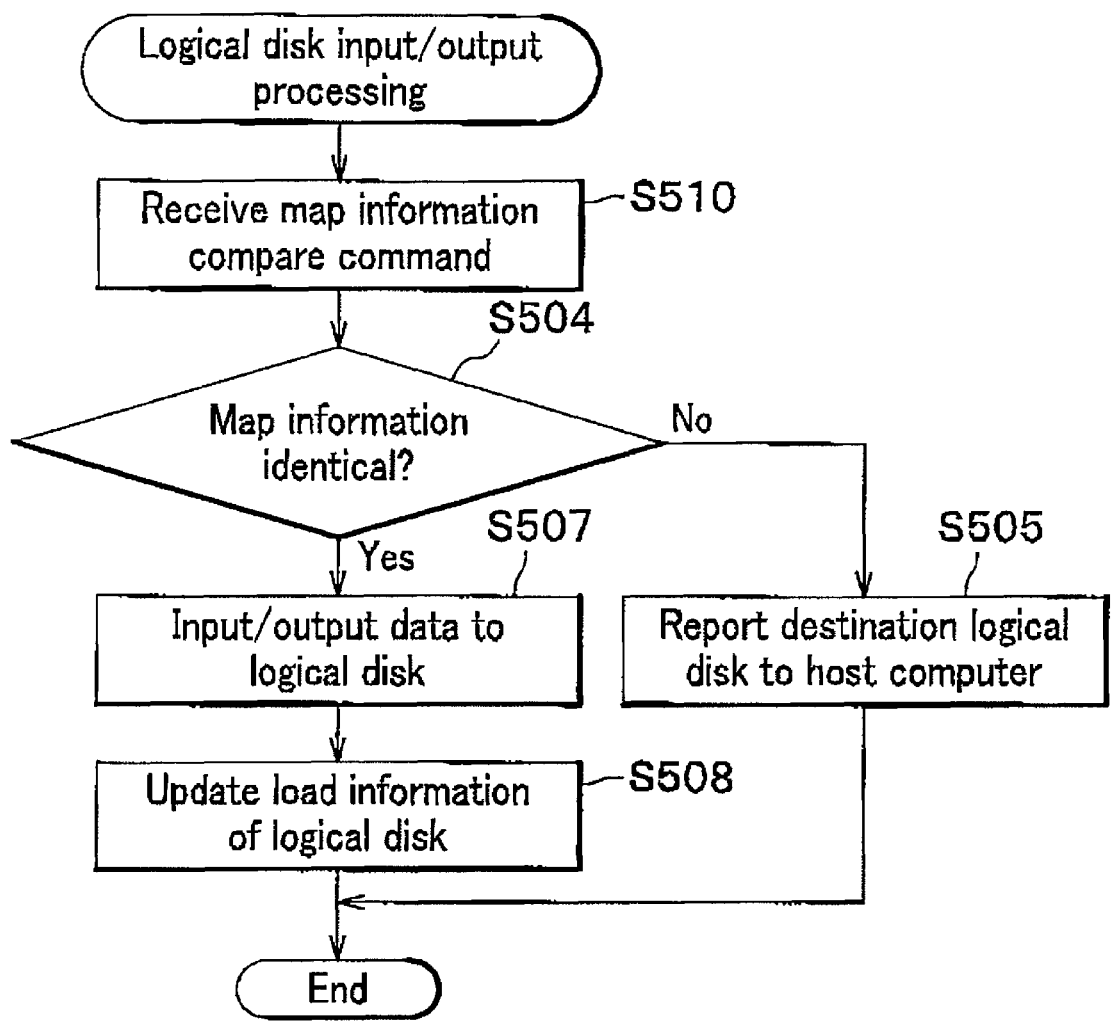
FIG. 6 is a flowchart showing an input/output processing into a virtual disk in a storage subsystem which is executed by the disk-using program according to the embodiment.

FIG. 6 is a flowchart showing an input/output processing into a virtual disk in the storage subsystem 150 which is executed by the disk-using program 121. The disk control device 160 receives the map information compare command attached to the input/output request from the host computer 100 (step S510) The logical disk control part 191 of the disk control device 160 checks the data status 401 in the logical disk map information table 192 (step S504).

In step S504, if a data is subjected to a remote copy to another logical disk and is moving, that is, if map information in a source logical disk is not identical to map information in a destination logical disk (if No in step S504), the disk control device 160 reports the destination logical disk (which may also be referred to as information on destination logical disk) to the host computer 100, after completion of the data movement (step S505), and terminates the processing. If the data has already been present in the destination logical disk, that is, map information in the source logical disk is identical to map information in the destination logical disk (if Yes in step S504), the disk control device 160 issues an input/output request into the physical disk 170 from the logical disk control part 191 to the disk input/output control part 181 so as to conduct an input/output into a logical disk (step S507). After completion of the input/output, the disk control device 160 updates the load information 403 in the logical disk map information table 192 (step S508) and terminates the processing.

<Load Distribution Data Movement Processing>

Figure 7:
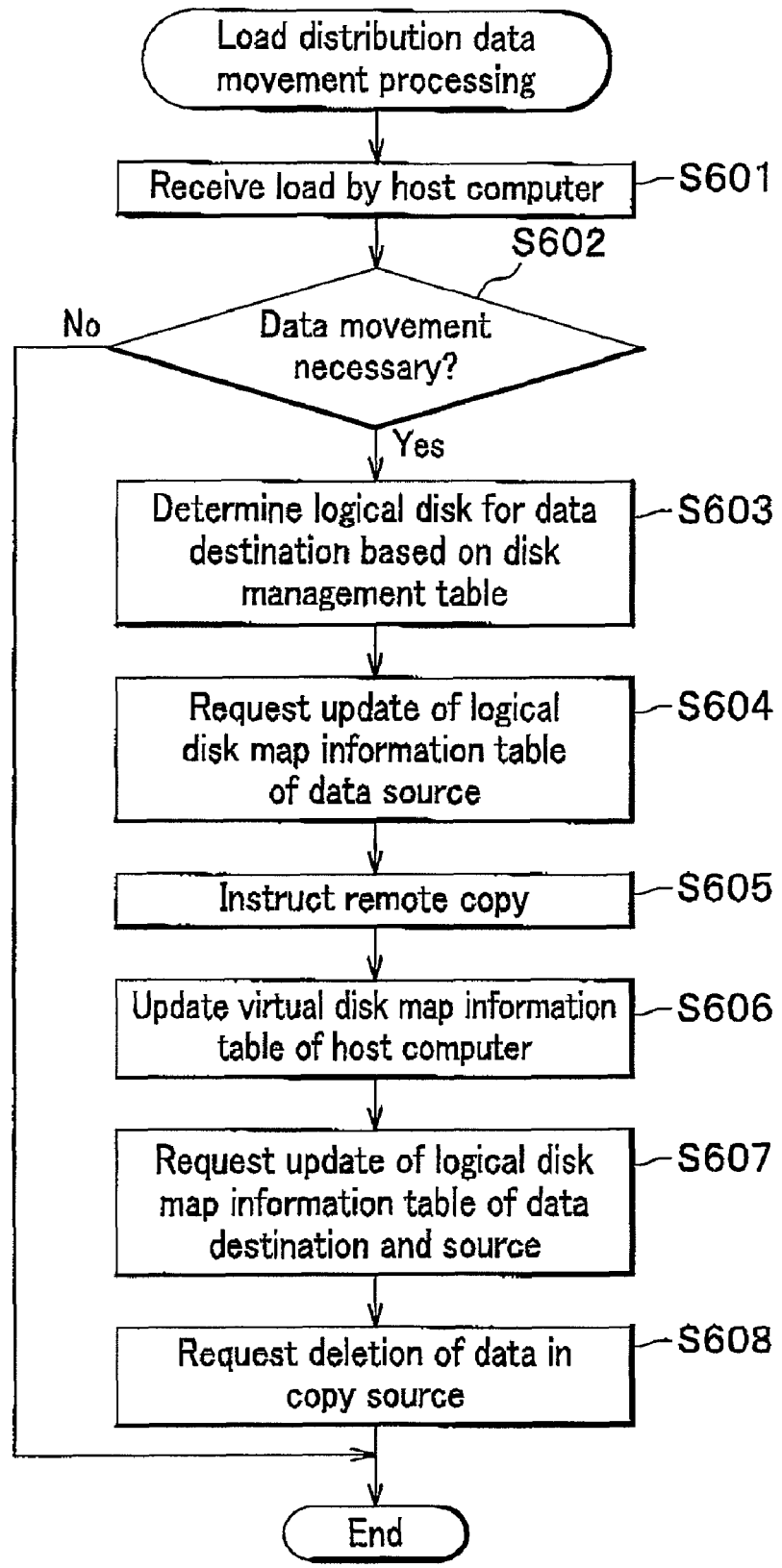
FIG. 7 is a flowchart showing a processing performed when data is moved between logical disks for load distribution according to the embodiment.

FIG. 7 is a flowchart showing a processing executed when a data is moved between logical disks for load distribution in asynchronization with an input/output into a virtual disk. The load monitoring part 183 of the storage subsystem 150 monitors a load of each logical disk at regular intervals. If the load reaches a certain level or over, the load monitoring part 183 reports the monitored load to the host computer 100 and a data movement is performed between the storage subsystems 150.

The load control part 134 of the host computer 100 receives a status of load on a logical disk in the storage subsystem 150 from the load monitoring part 183 at regular intervals (step S601). The load control part 134 stores the reported load information 403 in the disk management table 132 and determines whether or not a data movement between the logical disks is necessary due to a degree of difference in loads therebetween equal to or over a certain level (step S602). If the data movement is not determined to be necessary, that is, there is not an excessive difference in the loads therebetween (if No in step S602), the load control part 134 does not conduct the data movement, and terminates the processing.

On the other hand, if the data movement is determined to be necessary (if Yes in step S602), the load control part 134 determines a logical disk having a smaller load as a data destination, based on the information in the disk management table 132 (step S603), and conducts a map information table update request to the disk control device 160 of the storage subsystem 150 as the data destination (step S604). Upon receiving the map information table update request, the logical disk control part 191 of the storage subsystem 150 updates the data status 401 in the logical disk map information table 192 to "moving" and stores therein information on the destination logical disk.

The load control part 134 instructs the storage subsystem 150 to conduct a remote copy (step S605). The logical disk control part 191 requests the data movement to the remote copy processing part 182 and conducts the remote copy. Upon completion of the remote copy, the virtual disk control part 131 of the host computer 100 receives a completion acknowledgement from the logical disk control part 191 as a copy source and updates the logical disk for data output 301 in the virtual disk map information table 133 (step S606).

The load control part 134 sends a logical disk map information table update request to both of the storage subsystems 150 as data source and destination (step S607). The logical disk control part 191 as the source thus changes the data status 401 in the logical disk map information table 192 into "No data". The logical disk control part 191 as the destination changes the data status 401 in the logical disk map information table 192 into "Data present".

The load control part 134 issues a copy source data deletion request (step S608). The logical disk control part 191 as the source deletes information of interest in the physical disk for data output 402 and the load information 403 as management information, from the logical disk map information table 192 as the copy source, which completes the data movement.

At the time of startup of the host computer 100, the input/output execution management part 122 issues an input/output request of a map information acquire command to the disk control device 160 of the storage subsystem 150. The input/output request of a map information acquire command includes, for example, the logical disk name 201 which is a name of a logical disk configuring the virtual disk apparatus.

Upon receiving the map information acquire command, the logical disk control part 191 of the disk control device 160 checks the data status 401 in the logical disk map information table 192 and reports all of the map information to the host computer 100.

The host computer 100 transfers the reported map information to the virtual disk control part 131 and creates the disk management table 132 in which information on a logical disk associated with a virtual disk is stored and the virtual disk map information table 133 in which information on a data-storing logical disk on the virtual disk is stored.

If the host computer 100 is in trouble, the host computer 100 is restarted, and a processing same as that performed at a startup is conducted. This allows to re-create the disk management table 132 in which information on a logical disk associated with a virtual disk is stored and the virtual disk map information table 133 in which information on a data-storing logical disk on the virtual disk is stored.

The present invention also provides a load distribution management method. In the load distribution management method, an information system including the host computer 100 and a plurality of the storage subsystem 150 each for providing the host computer 100 with a storage space (for example, the physical disk 170) is managed while distributing loads on the storage space.

In the load distribution management method, the host computer 100 includes a first memory part (for example, the memory 120) in which first management information (for example, the disk management table 132 and the virtual disk map information table 133) for associating: a virtual disk for making storage spaces (for example, the physical disks 170) of a plurality of the storage subsystems 150 regard as virtualized disks; a space on the virtual disk; a logical disk to which a data in the virtual disk is outputted; and the load information on the logical disk, are stored, a plurality of the storage subsystems 150 includes a second memory part (for example, the memory 180) in which second management information (for example, the logical disk map information table 192) for associating: a logical disk; a space on the logical disk corresponding to the virtual disk; and the load information on the logical disk, and the load monitoring part 183 measures a load on the logical disk due to an input/output request into a logical disk and stores the measured load as the load information in the second management information, and the virtual disk control part 131 of the host computer 100 for controlling an input/output request into the virtual disk, upon receiving an input/output request (step S501), determines whether or not a space on a virtual disk specified by the input/output request is a not-ever-outputted space according to a determination whether or not a logical disk is assigned to a space on the virtual disk in the first management information, then, if the input/output request is to be performed into the not-ever-outputted space in which a logical disk is not assigned to the space on the virtual disk, identifies the logical disk on the virtual disk based on the load information in the first management information (step S502), sends the input/output request to a storage subsystem having the identified logical disk (step S503), and then, upon receiving a completion acknowledgement of the input/output request (step S511), updates the load information in the first management information based on the load information in the second management information (step S506).

In the load distribution management method, the host computer 100 further includes the load control part 134 for controlling load distribution of logical disk, and a plurality of the storage subsystems 150 in the information system further includes the remote copy processing part 182 for copying a data from one logical disk to another, and the load control part 134, upon receiving the load information from the load monitoring part 183 (step S601), stores the load information in the first management information, then, if there is determined to be a degree of difference in loads between the logical disks over a prescribed level (step S602), determines a logical disk having a smaller load as a data destination based on the first management information (step S603), requests a data movement and a copy thereof to the storage subsystem as the data source (step S605), receives an acknowledgement of the data movement from the storage subsystem as the data source and updates the first management information (step S606), issues an update request of the second management information in both of the storage subsystems as the data source and destination (step S607), and deletes the data in the storage subsystem as the data source (step S608).

In the load distribution management method, if the logical disk control part 191 of the storage subsystem 150 receives an input/output request into a logical disk while copying a data from one logical disk to another, the logical disk control part 191 completes the data copy and reports information on the logical disk as the destination to the host computer 100 (step S505). The virtual disk control part 131 of the host computer 100 receives the report of the information on the destination logical disk from the storage subsystem 150, and then, updates the first management information (step S506).

The invention claimed is:

1. A storage system comprising:
a host computer; and
a plurality of storage subsystems each for providing a storage space to the host computer,
wherein the host computer comprises:
a first memory part for storing therein first management information in which a virtual disk for making the storage space in a plurality of the storage subsystems as a virtual disk, a space on the virtual disk, a logical disk to which the virtual disk outputs a data, and load information on the logical disk are associated with each other; and a virtual disk control part for controlling an input/output request into the virtual disk,
wherein a plurality of the storage subsystems comprises:
a second memory part for storing therein second management information in which the logical disk, a space on the logical disk corresponding to the space on the virtual disk, and load information on the logical disk are associated with each other; and
a load monitoring part for measuring load on the logical disk by the input/output request and storing the measured load in the second management information as load information, and
wherein the virtual disk control part
determines, if an input/output request into the virtual disk is performed, whether or not a space on a virtual disk specified by the input/output request is a not-ever-outputted space into which a data has not ever outputted, according to a determination whether or not the logical disk is assigned to a space on the virtual disk in the first management information,
identifies, if the input/output request is to be performed to the not-ever-outputted space in which a logical disk is not assigned to the space on the virtual disk, a logical disk on the virtual disk based on the load information in the first management information,
sends the input/output request to a storage subsystem having the identified logical disk, and
updates, upon receiving a completion acknowledgement of the input/output request, the load information in the first management information based on the load information in the second management information.

2. The storage system according to claim 1,
wherein the host computer further comprises a load control part for controlling load distribution to the logical disk,
wherein a plurality of the storage subsystems each further comprise a copy processing part for copying a data from one logical disk to another, and
wherein the load control part
upon receiving the load information from the load monitoring part, stores therein the load information,
determines whether or not there is a degree of difference in loads between the logical disks over a prescribed level, and, if there is determined to be a degree of difference over the prescribed level, determines a logical disk having a smaller load as a data destination based on the first management information,
requests a data movement and a copy thereof to the storage subsystem as a data source,
updates, upon receiving an acknowledgement of the data movement from the storage subsystem as the data source, the first management information, and sends an update request of second management information in the storage subsystems as the data source and destination, and
deletes the data in the storage subsystem as the data source.

3. The storage system according to claim 1,
wherein the storage subsystem further comprises a logical disk control part,
wherein, if the logical disk control part receives an input/output request into a logical disk while the logical disk control part is copying a data from one logical disk to another, the logical disk control part reports, after completion of the data copy, information on the logical disk as the data destination to the host computer, and
wherein the virtual disk control part of the host computer receives the report of the information on the logical disk as the data destination from the storage subsystem and updates the first management information.

4. The storage system according to claim 1, wherein the virtual disk and the logical disk have same capacity and in-space address.

5. The storage system according to claim 1,
wherein the virtual disk control part manages the virtual disk by cylinders,
wherein the virtual disk and the logical disk have same number of cylinders, and
wherein, if a cylinder in the virtual disk has a cylinder number x, a cylinder in the logical disk corresponding to the virtual desk also has the cylinder number x.

6. A load distribution management method in an information system comprising a host computer and a plurality of storage subsystems each for providing a storage space to the host computer, the load distribution management method for distributing and managing load on the storage space,
wherein the host computer comprises:
a first memory part for storing therein first management information in which a virtual disk for making the storage space in a plurality of the storage subsystems as a virtual disk, a space on the virtual disk, a logical disk to which the virtual disk outputs a data, and load information on the logical disk are associated with each other; and
a virtual disk control part for controlling an input/output request into the virtual disk,
wherein a plurality of the storage subsystems comprises:
a second memory part for storing therein second management information in which the logical disk, a space on the logical disk corresponding to the space on the virtual disk, and load information on the logical disk are associated with each other; and
a load monitoring part for measuring load on the logical disk by the input/output request and storing the measured load in the second management information as load information, and
wherein the virtual disk control part
determines, if an input/output request into the virtual disk is performed, whether or not a space on a virtual disk specified by the input/output request is a not-ever-outputted space into which a data has not ever outputted, according to a determination whether or not the logical disk is assigned to a space on the virtual disk in the first management information,
identifies, if the input/output request is to be performed to the not-ever-outputted space in which a logical disk is not assigned to the space on the virtual disk, a logical disk on the virtual disk based on the load information in the first management information,
sends the input/output request to a storage subsystem having the identified logical disk, and
updates, upon receiving a completion acknowledgement of the input/output request, the load information in the first management information based on the load information in the second management information.

7. The load distribution management method according to claim 6,
wherein the host computer in the information system further comprises a load control part for controlling load distribution to the logical disk,
wherein a plurality of the storage subsystems each further comprise a copy processing part for copying a data from one logical disk to another, and
wherein the load control part
upon receiving the load information from the load monitoring part, stores therein the load information,
determines whether or not there is a degree of difference in loads between the logical disks over a prescribed level, and if there is determined to be a degree of difference over the prescribed level, determines a logical disk having a smaller load as a data destination based on the first management information,
requests a data movement and a copy thereof to the storage subsystem as a data source,
updates, upon receiving an acknowledgement of the data movement from the storage subsystem as the data source, the first management information, and sends an update request of second management information in the storage subsystems as the data source and destination, and
deletes the data in the storage subsystem as the data source.

8. The load distribution management method according to claim 6,
wherein the storage subsystem further comprises a logical disk control part,
wherein, if the logical disk control part receives an input/output request into a logical disk while the logical disk control part is copying a data from one logical disk to another, the logical disk control part reports, after completion of the data copy, information on the logical disk as the data destination to the host computer, and
wherein the virtual disk control part of the host computer receives the report of the information on the logical disk as the data destination from the storage subsystem and updates the first management information.

9. The load distribution management method according to claim 6, wherein the virtual disk and the logical disk have same capacity and in-space address.

10. The load distribution management method according to claim 6,
wherein the virtual disk control part manages the virtual disk by cylinders,
wherein the virtual disk and the logical disk have same number of cylinders, and
wherein, if a cylinder in the virtual disk has a cylinder number x, a cylinder in the logical disk corresponding to the virtual desk also has the cylinder number x.

11. A storage medium storing therein the load distribution management method according to any one of claims 6 to 10 as a program executable by a CPU.

* * * * *